UNITED STATES PATENT OFFICE.

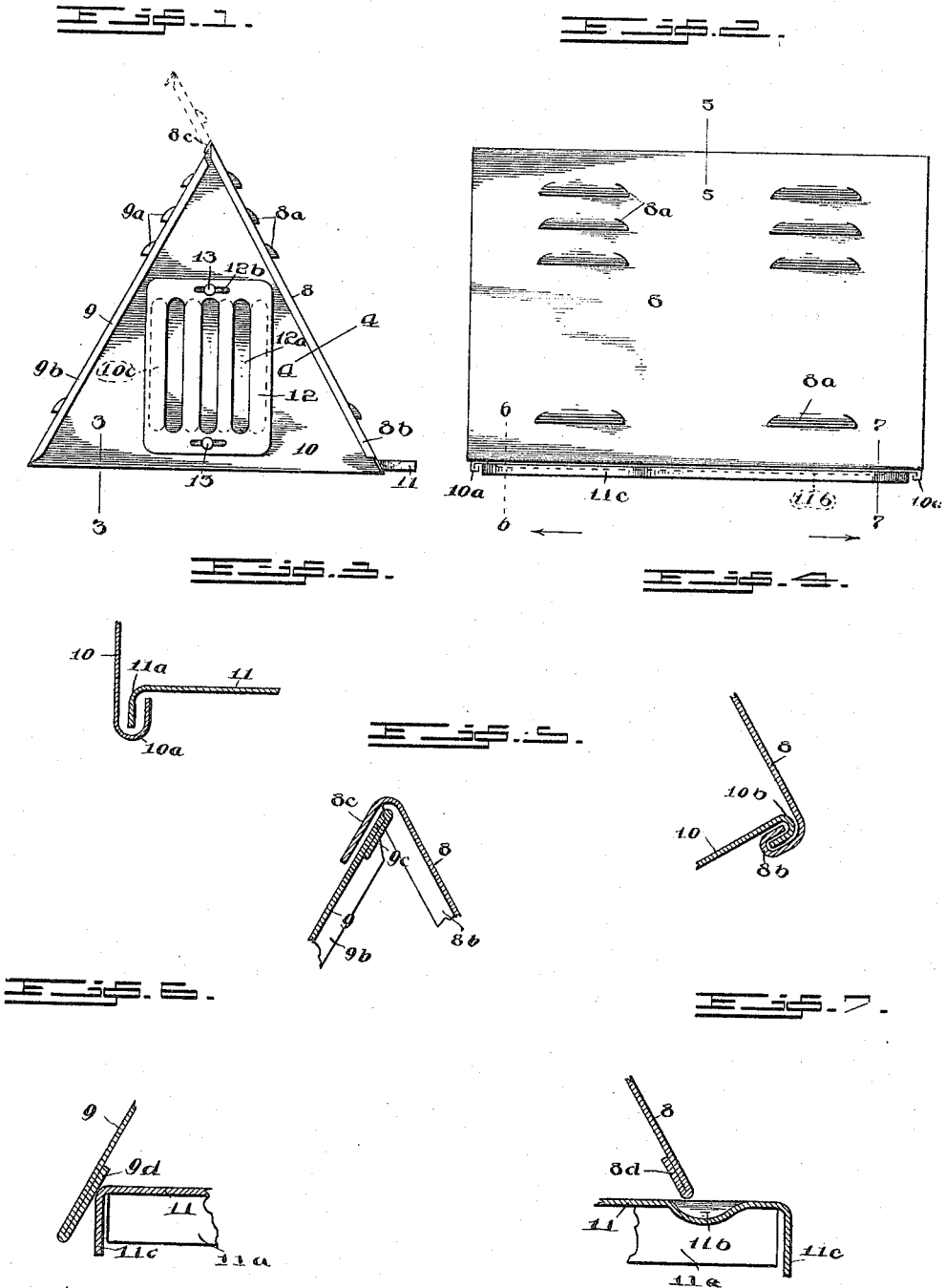

CHRISTOPHER WRIGHT, OF MUSKEGON, MICHIGAN.

COLLAPSIBLE CHICKEN-COOP.

1,145,646.  Specification of Letters Patent.  Patented July 6, 1915.

Application filed June 28, 1912. Serial No. 706,329.

*To all whom it may concern:*

Be it known that I, CHRISTOPHER WRIGHT, citizen of the United States, residing at Muskegon, in the county of Muskegon and State of Michigan, have invented certain new and useful Improvements in Collapsible Chicken-Coops, of which the following is a specification.

This invention relates to improvements in poultry coops, dog kennels, and similar sheltering structures, and the especial object of the improvements which form the subject matter of this application is to provide an all metal structure of simple form, that can be readily assembled and knocked down; that can be shipped in compact form; that will afford ample ventilation for the poultry or animals housed therein; that will thoroughly protect them from attacks by rodents; that will facilitate the feeding and watering of the animals or poultry within the coops; that will protect them from the elements, and that provides quick and ready means for allowing the animals or birds egress from or ingress to the sheltering device.

In the accompanying drawings which form a part of this application, I have illustrated a preferred form of my invention in the following views:

Figure 1 is an end elevation of my improved coop in its assembled form; Fig. 2 is a side elevation of the same; Fig. 3 is an enlarged fragmental sectional view on line 3—3 of Fig. 1, showing the joint or connection between the bottom member and one of the end members of the coop; Fig. 4 is a similar sectional view on line 4—4 of Fig. 1, showing the interlocking joint or connection between one of the side members and one of the end members; Fig. 5 is an enlarged section on line 5—5 of Fig. 2, and shows the connection between the two side members at the apex or top of the coop; Fig. 6 is a fragmental sectional view on the line 6—6 of Fig. 2, showing the relative position of one of the side members and the bottom member, and—Fig. 7 is an enlarged sectional view taken on the line 7—7 of Fig. 2, showing the relative position of one side member and the bottom.

Referring to the details of said drawings, and it being understood that my entire coop is constructed from sheet metal, the reference numerals 8 and 9 represent respectively, the side members of the device, in each of which there are formed ventilating openings extending longitudinally thereof near the top and bottom and having overhanging weather excluding guards $8^a$, $9^a$, formed by punching outwardly the metal when the openings are formed, by suitable die operations well known in the art. At each end of the members 8 and 9, double flanges $8^b$, $9^b$, are formed by bending the metal at right angles and then rebending it inwardly, as clearly shown in Fig. 4. The member 8 is bent along its upper edge at an acute angle to form a flange $8^c$, which overhangs the folded corresponding edge $9^c$, of the member 9, as clearly shown in Fig. 5.

The end members 10, correspond in all particulars. They are triangular in shape and bent along their lower or base edges, to form a groove $10^a$. (see Fig. 3) and along their inclined edges, to form inturned flanges $10^b$ which are adapted to interlock with the corresponding adjacent flanges $8^b$, $9^b$, of the side members 8 and 9. This interlocking of the end members 10 with side member 8 and the opposite side member 9 being the same in both instances, I have, for convenience, only illustrated the interlocking between the end member and side 9 (Fig. 4) from which the manner of interlocking of said end member with side 8 will be well understood. The end members have portions cut therefrom to provide the vertical slots shown in dotted lines in Fig. 1, designated as $10^c$. These slots are adapted to be covered by slidable shutters 12, which are formed with vertical slots $12^a$ corresponding to the slots $10^c$; and also at their upper and lower ends, with small horizontal slots $12^b$ through which extend rivets 13 which project from the outer face of the end members and serve, with the slots $12^b$, to provide a limited slidable connection for said shutters with said end members.

The bottom member 11 is bent along its ends to form the vertical flanges $11^a$, which slidably engage the gutters or grooves $10^a$ in the end members, and along their longitudinal edges are bent to provide downwardly extending vertical flanges $11^c$. The bottom is made somewhat wider than the span of the side members 8, 9, so that when the parts are in their assembled relation said bottom projects a short distance beyond the side, 8, of the coop, as shown in Figs. 1 and 7. The inner flange 11ᶜ abuts against the doubled lower edge 9ᵈ of the side member 9, as shown in Fig. 6. For a portion of its length, the bottom is depressed to form a longitudinal recess 11ᵇ, which is so placed as to come below the lower doubled edge 8ᵈ of the side 8, when the parts are in their assembled relation. This recess or depression serves as a receptacle for food or water which is accessible to small chickens within the coop, and may be reached by the larger fowls by sliding upwardly the side 8, as indicated by dotted lines in Fig. 1.

When it is desired to place the fowls in the coop or permit them to leave the same, the side member 8 will be slid upwardly a sufficient distance to permit the passage of the largest fowls under its lower edge 8ᵈ. The frictional contact between the interlocking end flanges of the member 8 and the adjacent flanges of the end members 10, will be sufficient to retain the member 8 in whatever adjusted position may be given it. When it is desired to inclose the fowls within the coop, the side member will be pushed downwardly to its closed position, as indicated in full lines in Fig. 1.

When disassembled, the parts composing my improved coop or sheltering device will lie substantially flat in superposed relation and will thus permit the economical shipping of a large number of pieces.

While I have illustrated and described my device as applicable to a coop or kennel, it is obvious that the principles of construction embodied therein may be utilized for any form of shelter of any size and of any material which will lend itself to the details set forth. It is also obvious that instead of making the members entirely of sheet metal they can be made with their edges of sheet metal to provide the interlocking flanges described and these can be suitably secured to other material forming the bodies of said members.

Having thus described my invention, what I claim as new, is:—

1. A knock-down sheltering device comprising two substantially triangular-shaped end pieces, two rectangular-shaped side pieces having flanged end edges that slidably interlock with the inclined edges of said end pieces, and a rectangular shaped bottom piece having flanged end edges that slidably interlock with the lower edges of said end pieces, said side, end and bottom piece being removably fitted together, substantially as described.

2. A sheltering device composed of triangular shaped end pieces having suitable ventilating openings therein, adjustable means for closing said openings, in combination with rectangular side pieces having slidable relation with said end pieces, and one of said pieces being adapted to be slidably adjusted on said end pieces to provide a passageway for said device, and a bottom piece slidably arranged on said end pieces and having an interlocking connection therewith.

3. A sheltering device composed of end pieces having suitable ventilating openings therein and having marginal flanges thereon, side pieces having suitable ventilating openings therein and provided with marginal flanges adapted to interlock with the adjacent flanges of the end pieces, and a bottom member having a food receptacle formed integral therewith that is adapted to partially enter said sheltering device, said member provided with flanges adapted to interlock with the adjacent marginal flanges of the end pieces.

In testimony whereof I affix my signature in the presence of two witnesses.

CHRISTOPHER WRIGHT.

Witnesses:
M. A. MILORD,
G. W. HILTABRAND.